United States Patent Office 2,700,047
Patented Jan. 18, 1955

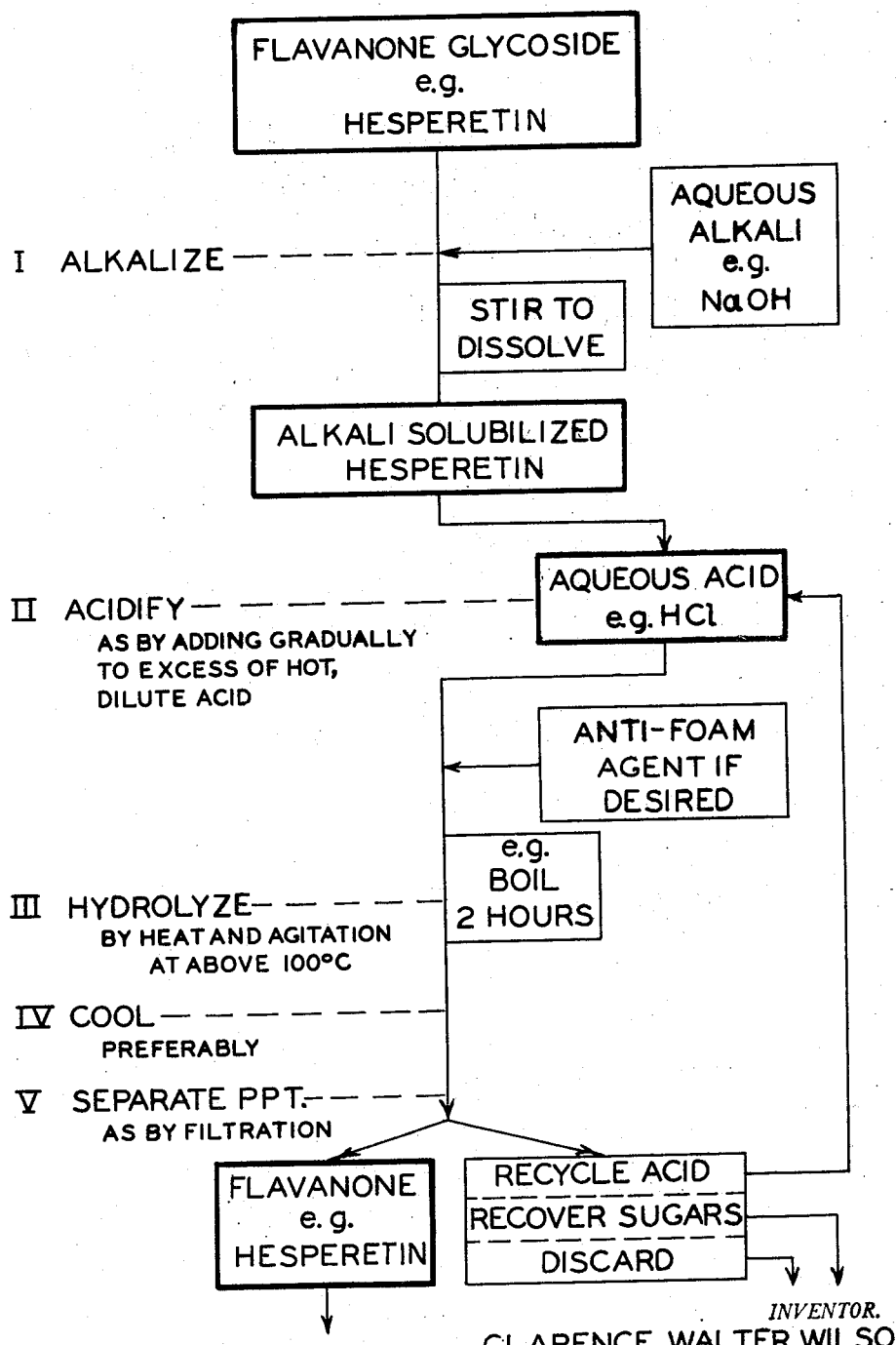

2,700,047
AQUEOUS HYDROLYSIS OF FLAVANONE GLYCOSIDES

Clarence Walter Wilson, Ontario, Calif., assignor to Sunkist Growers, Inc., Los Angeles, Calif., a corporation of California Application June 16, 1951, Serial No. 232,013

7 Claims. (Cl. 260—345.2)

This invention relates to a novel process for hydrolyzing certain acid insoluble flavanone glycosides such as hesperidin in order to obtain the corresponding aglycone which, in the case of hesperidin, would be hesperetin. The novel process comprises first, dissolving the flavanone glycoside in an aqueous alkaline solution, then rapidly acidifying the alkaline solution to a pH below about 1.0 while maintaining the acidified mixture at a high temperature, whereupon an acid-soluble complex is formed, and boiling the acidified mixture for a time sufficient to effect substantial hydrolysis, whereupon the aglycone, e. g. hesperetin, is thrown out of solution, and the sugar residue remains in the solution.

The classical method for the hydrolysis of hesperidin to split off the sugar component is that disclosed by Tieman and Will, Ber. 14 (1881) 946–974, involving acid hydrolysis in a medium comprising equal volumes of alcohol and water at a temperature of from 115–120° C., and superatmospheric pressures. Under these conditions the reaction requires at least 3 hours for completion. My present invention may be regarded as a major modification and improvement over this process.

The hydrolysis of hesperidin must take place in solution if a practical reaction velocity is to be attained. However, hesperidin is almost completely insoluble in neutral and acidic aqueous systems, and this fact has heretofore necessitated the use of partially or predominantly non-aqueous solvents such as alcohol to effect acid hydrolysis of this material. The use of such non-aqueous solvents is disadvantageous from the standpoint of rarifying the available water molecules, and thereby reducing the reaction velocity. Also, as a practical matter, in using any medium having a boiling point lower than water, or one diluted with any appreciable quantity of non-aqueous solvent, it is necessary to carry out the reaction in a pressure vessel in order to reach high enough temperatures to give a reasonably rapid reaction velocity. The materials required for construction of such pressure vessels capable of resisting the action of hot alcoholic acid solutions at elevated pressures are very expensive. Moreover, it is difficult to follow and control the course of the reaction in such vessels. These factors, together with the expense involved in the use of non-aqueous solvents, have made commercial adaptation of such methods impractical in the past.

It is therefore an object of my invention to provide an economical and commercially practicable method for hydrolyzing hesperidin and like materials to obtain the corresponding aglycone.

A more specific object is to provide means whereby hesperidin may be maintained in aqueous acid solution for a sufficient length of time for hydrolysis to take place.

Another object of the invention is to provide means and methods whereby hesperidin may be commercially hydrolyzed at atmospheric pressure.

A still further object is to eliminate the use of hydrolysis-inhibiting non-aqueous solvents as a reaction medium in the hydrolysis of hesperidin.

These and further objects and advantages will appear more fully to those skilled in the art from a consideration of the invention as set forth in the following description, and in the appended claims.

The flavanone glycosides herein concerned consist of various naturally occurring compounds having a phenolic flavanone nucleus, to which is attached, through one or more phenolic acetal linkages, any of various sugar residues which may be either monosaccharidic or polysaccharidic. More specifically, my process is applicable to those flavanone glycosides such as hesperidin which are insoluble in aqueous acidic solution, and which form soluble chalcones in alkaline solution. Hesperidin is, in fact, the compound with which I am at present most directly concerned. It has the following apparent structural formula:

(I)
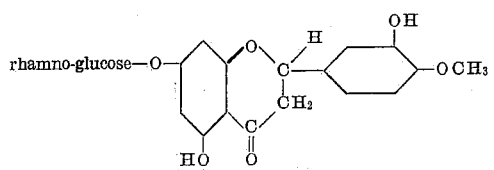

This compound is found to occur naturally in the albedo of most citrus fruits, as well as the juice portion of the fruit, and traces have also been found in the leaves, twigs and bark of citrus trees. It may generally be extracted from citrus pulp by leaching with an aqueous alkali such as lime water, and acidifying the extract to precipitate hesperidin. The crude hesperidin so obtained may then, either with or without further purification, form the raw material for the present process.

My process depends upon a preliminary treatment of the hesperidin with alkali to form a water soluble salt, preferably the corresponding chalcone of hesperidin having the probable formula:

(II)
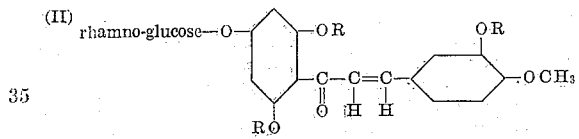

where R is a metallic radical. This chalcone form is quite soluble and stable in alkaline solutions but, under most conditions, reverts readily to the insoluble hesperidin (I) when placed in an acid or neutral environment. I have discovered that this reversion may be either rapid or extremely slow, depending upon the conditions. Rapid reversion is ordinarily favored by (1) an environment of only moderate acidity or very slight alkalinity, from about pH 1 to 9, and (2) insufficient solvent to keep the acidified hesperidin in solution. A considerably slower reversion is obtained if the alkali solubilized hesperidin is placed in a more definitely acidic environment having a pH below about 1.0.

I have found, for example, that if the alkaline chalcone solution is acidified to a pH of below about 1.0, and preferably below about 0.5, in such manner that the near-neutral pH range from about 1 to 9 is rapidly passed over, sufficient aqueous solvent also being present, no precipitate will be formed for a considerable length of time. If the temperature of the mixture is sufficiently high, preferably above 100° C., a substantial amount of the hesperidin may undergo hydrolysis to hesperitin before any distinct precipitation of hesperidin occurs. This surprising phenomenon is one which I have been unable to definitely account for, but it would appear possible that, under the preferred conditions as outlined, a somewhat stable, acid-soluble oxonium salt may be formed. I am unaware, if such a salt is formed, as to whether it is of the chalcone or the reverted hesperidin. In either case, however, the acid-soluble material is hydrolyzable to hesperetin, and may be maintained in solution a sufficient length of time for substantial hydrolysis to take place, so that when the final precipitate is formed it contains only small amounts of hesperidin, the predominant proportion being hesperetin having the following probable formula:

(III)
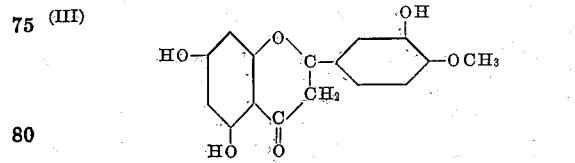

Following is a specific example showing a preferred form of my process:

EXAMPLE

Part A.—Hesperidin chalcone solution 210 gms. of sodium hydroxide is dissolved in 2100 ml. of water and the solution is cooled. To the cooled solution is added 1350 gms. of 85% pure hesperidin, and agitation is continued until the hesperidin is completely dissolved. It is desirable at this stage, and throughout the process, to avoid emulsifying air into the solution.

Part B.—Acid solution

The acid for hydrolysis is prepared by mixing 6 liters of water with 888 ml. concentrated muriatic acid (35% HCl) in a 12 liter glass vessel equipped preferably with a steam heating coil.

Part C.—Hydrolysis

The acid prepared in part B is brought to boiling by introducing steam under pressure into the heating coil. The alkaline chalcone solution is then poured gradually into the acid at such a rate that boiling does not cease. The addition should take about 20 to 25 minutes. If impure hesperidin is used, the addition of a suitable antifoam agent such as octyl alcohol may be desirable. By proceeding in the manner outlined, each increment of chalcone solution is rapidly acidified and the temperature of the acidified portion never drops substantially below boiling.

After the addition is complete the heating rate should be reduced to avoid excessive vapor losses (unless a reflux condenser is employed). Boiling and agitation are continued for at least 2 hours from the start of addition of the chalcone solution. The temperature of the boiling mixture is about 104° C. After about 15 minutes of boiling, a dark, oily appearing precipitate is formed, the composition of which is unknown, but which may contain partially hydrolyzed or polymerized hesperidin and other impurities. Toward the end of the hydrolysis, however, the oily phase disappears and is replaced by a granular precipitate consisting essentially of hesperetin.

Part D.—Recovery

The hydrolysis batch is first cooled to allow maximum precipitation of the hesperetin, and is then filtered through, for example, a Buechner funnel. The precipitate is then washed with cold water until all acid is removed, and the filtrate may either be discarded or treated for recovery of its content of sugars, salts and acid. The precipitate is air dried at 100° to 150° C. The yield is found to be nearly theoretical, about 563 gms., including a small amount of impurities.

The details and operative variations of the process may be more completely understood by reference to the accompanying flow-sheet and the following discussion.

The starting material may consist of any acid insoluble flavanone glycoside which forms a soluble compound or complex with alkalis. The most conspicuous member of this group, and the one with which I am at present most concerned, is hesperidin. My process is applicable to either crude hesperidin or the purified product, but obviously the purer the starting material the smaller will be the quantity of complicating impurities in the final product.

Step I.—Alkalizing

In this step, the alkaline material used may be any alkali capable of forming a soluble complex with the flavanone glycoside. This includes predominantly the alkali metal hydroxides and ammonium hydroxide, although the latter compound is not preferred. The quantity of monovalent alkali required will vary with the number of phenolic hydroxyl groups in the flavanone nucleus. For hesperidin the ratio should preferably be about three moles of alkali to one of hesperidin if it is desired to completely chalconize the hesperidin. However, this molar ratio may vary up to 4 to 1 or more, although such quantities are merely wasteful of alkali. It is possible to obtain a solution of hesperidin with only two molar proportions of sodium hydroxide, for example, but this amount is insufficient to completely form the chalcone, and the resulting solution contains largely a phenolic sodium salt of hesperidin. Such a sodium hesperidinate solution may be added to the acid solution as outlined in the above example without forming a precipitate, and may be successfully hydrolyzed. However, under these conditions, considerable amounts of hydrolysis resistant varnish-like impurities are sometimes formed during hydrolysis, and may contaminate the final product. For that reason I prefer to use sufficient alkali to virtually completely chalconize the hesperidin, which would be about 3 moles to 1 mole of hesperidin.

As long as the above molar ratios are maintained the amount of water employed in making up the hesperidin-alkaline solution is not critical, but I prefer to keep the volume small for convenience in handling by forming as concentrated a solution as possible. Otherwise the concentration of hesperidin and alkali in solution is not critical and may be varied considerably from the example given.

The actual mixing of the hesperidin with the alkaline solution may be accomplished in any desired manner; the material quickly goes into solution with moderate stirring. Inasmuch as phenolic materials are frequently subject to oxidation reactions under alkaline conditions, I prefer at this stage, and throughout the alkaline phases of the process, to avoid introducing air into the mixture.

It is also distinctly preferable to avoid heating the alkaline solution, as this may tend to cause cleavage at the aglycone ketone group to form, ultimately, isoferulic acid and phloroglucinol.

Step II.—Acidification

In this step it is essential to acidify the alkaline solution in such manner that the solubilized flavanone glycoside is transferred rapidly to an environment having a pH sufficiently low to provide a rapid hydrolysis rate, as hereinafter specified, and to inhibit the precipitation of hesperidin. This normally requires a pH below about 1.0. In converting the environment of the alkali solubilized hesperidin to that pH, the intermediate range from about pH 1 to 9 should be rapidly passed over, since it is in that range that hesperidin is particularly apt to precipitate. At the same time it is desirable to maintain near-boiling temperatures to accelerate the hydrolysis, and to maintain sufficient solvent and acid to keep the acid-solubilized hesperidin in solution. I have found that the most practical method of achieving all these aims is to add the alkaline solution, with agitation, slowly to a boiling excess of dilute acid. The operative rate of addition varies to some extent, depending upon the efficiency of agitation of the mixture, and should be so adjusted as to avoid formation of a precipitate before hydrolysis has proceeded substantially. I have found moreover that it is much more difficult, and in fact, practically impossible to prevent initial precipitation if the acid is added to the alkaline hesperidin solution, and I therefore prefer the reverse order of addition, although any manner of mixing which will satisfy the basic requirements outlined is contemplated.

The volume of hot acid solution employed should be large enough to minimize or substantially eliminate temperature fluctuations upon the gradual addition of the cool alkaline solution. If the temperature is allowed to drop while the mixture is on the acid side, the rate of formation of insoluble hesperidin may exceed the rate of hydrolysis, whereupon precipitation may occur. Moreover, if the total volume of solvent formed by admixture of the acid and alkaline solutions is too small, the inorganic salts formed by neutralization may be sufficiently concentrated in the mixture to "salt out" the hesperidin, or its acid solubilized complex. For this reason I prefer to maintain a total ratio of aqueous acidic solvent to hesperidin of about 8 to 1 by weight. This entails normally the use of about 6 liters of acid solutions to 1 kilogram of hesperidin dissolved or chalconized in about 2 liters of alkaline solution. The ratio of total solvent to hesperidin may, however, be increased as far as is economically desirable, and may be decreased somewhat by employing a minimum quantity of alkali and/or a stronger acid solution. The volume ratio of alkaline hesperidin solution to acid solution may also be varied considerably, but I find it more convenient to provide a predominant part of the aqueous solvent through the acid solution.

The acid solution should contain sufficient acid to provide a final hydrolysis mixture having a pH below about 1.0, and preferably below about 0.5, and which may range downwardly therefrom as low as may be obtained without damaging any of the organic reactants. To get within this range will require different normalities of different acids; for example a reaction mixture 0.5 normal with hydrochloric acid may have a pH of 0.13, while a 1.0 normal sulfuric acid mixture may have a pH of 0.42. It is to be understood that these normalities and pH's represent the excess of acid left in the reaction mixture after the excess alkali and chalcone or hesperidin salt have been neutralized.

*Step III.—Hydrolysis*

The rate at which the acid-solubilized hesperidin is hydrolyzed to form hesperetin depends principally upon the temperature and acidity of the reaction mixture. The over-all precept to be observed in this step is to maintain a high enough temperature and acidity to drive the hydrolysis reaction to a satisfactory completion before any appreciable quantity of the acid solubilized hesperidin is precipitated as hesperidin. If, because of low acidity or low temperature, the reaction is not substantially completed within about 3 hours, it will generally be found that the residual hesperidin has precipitated in a form that does not readily undergo hydrolysis.

The temperature to be maintained during hydrolysis is preferably that of the boiling point of the reaction mixture, which would ordinarily be about 104° C. High temperatures, not appreciably below 100° C., are preferred in order to accelerate the rate of hydrolysis. It is, of course, permissible to employ higher temperature, such as may be attained by carrying out the reaction in a pressure vessel, but from a commercial standpoint this is seldom desirable. Temperatures lower than 100° C. may be employed, but usually the reaction time is thereby prolonged, and the product contains considerable hesperidin. These disadvantages may be overcome to some extent by employing a higher acidity for the hydrolysis; this has the effect of accelerating the hydrolysis, and of inhibiting the precipitation of hesperidin in an unreactive form.

An interesting and probably complex phenomenon which is observed during the hydrolysis reaction is the formation, after about 15 minutes of boiling, of a dark, oily appearing, apparently insoluble phase of unknown composition. As the reaction proceeds, however, this phase gradually solidifies and becomes a granular precipitate of hesperetin. The appearance of the oily phase should not be confused with the normal precipitation of hesperidin from its chalcone solution by acidification. The latter type of precipitate is either granular or powdery, and the material is the ordinary acid-insoluble hesperidin (I), which is extremely resistant to aqueous phase acid hydrolysis. The oily precipitate formed herein is, by contrast, readily hydrolyzable, and does not ordinarily contaminate the final product to any appreciable extent. It may or may not contain hesperidin, but if so the hesperidin is in a complex form which readily returns to solution in the aqueous phase.

The formation of the oily phase may be but another manifestation of the complex solubility-phase changes which other flavanones, and even flavones, are known to undergo. Naringin, for example, is quite insoluble in water, but may be readily dissolved in acetone. Such a saturated acetone solution will, upon standing, spontaneously precipitate crystals of naringin which may be recovered, and then surprisingly, dissolved readily and completely in water. Such water solution will then, upon standing, reprecipitate acetone-soluble naringin.

However, regardless of the explanation for the observed phenomenon, it is a fact that the chemical entity now recognized as hesperidin is almost completely insoluble in aqueous acid of the concentration employed, and is extremely resistant to aqueous acidic hydrolysis, while the oily precipitate formed herein is a transient phase, presumably because it is readily hydrolyzable to hesperetin.

Due to the formation of the oily phase, it is preferable to vigorously agitate the mixture during hydrolysis, both to promote intimate contact between the two phases, and to prevent sticking and charring of the oily phase on the heating surface.

It may be desirable also, especially if an impure hesperidin is used as starting material, to employ an anti-foam agent such as octyl alcohol or other known foam suppressor, during the boiling of the mixture.

The hydrolysis reaction should ordinarily be completed after about 2 to 3 hours of boiling. If the reaction is not satisfactorily completed in this length of time, it will usually be found that improper operating conditions, e. g. too low acidity, or too low reaction temperature or too rapid addition of the chalcone solution will have permitted a partial precipitation of hesperidin in unreactive form which will contaminate the final product. I therefore prefer to maintain such conditions of temperature and acidity as will drive the hydrolysis to satisfactory completion in about 2 to 3 hours.

*Step IV.—Cooling*

It is preferred to cool the reaction mixture in order to obtain as complete a precipitation of hesperetin as may be possible. This is entirely optional, however, and in certain cases it may be desirable to filter the solution hot, when for instance large amounts of impurities are present that are soluble in the hot solution but not in the solution after cooling. In either case small amounts of hesperetin will remain in solution in the mother liquors, and may be subsequently recovered if desired.

*Step V.—Separation*

Separation of the precipitated hesperetin may be accomplished in any of the conventional methods, as by filtration, settling and decantation, or centrifuging. The precipitate is then washed with cold water and dried to obtain a fairly pure grade of hesperetin. The filtrate may then be discarded or treated to recover any of the values contained therein, such as hesperetin, sugars, salts, acid, or it may be, to at least a limited extent, recycled to the hydrolysis step since it still contains a large excess of acid.

The hesperetin obtained may be further purified if desired by recrystallization, but for most chemical purposes is sufficiently pure as obtained. The crude product may for example be used directly as an intermediate to form azo dyestuffs, or may be subjected to alkaline cleavage to produce insoferulic acid and phloroglucinol. If the product is to be used directly for medicinal purposes, however, it should be further purified.

It will thus be seen that I have provided a convenient, economical method for the hydrolysis of a very refractory glycoside which has in the past required difficult and expensive procedures for effective hydrolysis. While the process has been described specifically with reference to one preferred material and to certain preferred conditions, I do not wish to be limited to such details, but only broadly as set forth in the following claims. I therefore claim as my invention:

1. A process for preparing a flavanone from a flavanone glycoside insoluble in aqueous acid and capable of forming a soluble complex with alkali which comprises first dissolving the flavanone glycoside in an aqueous solution of an alkali selected from the class consisting of the alkali metal hydroxides and ammonium hydroxide, rapidly acidifying said alkaline solution of flavanone glycoside to a pH below about 1 with an aqueous acid selected from the class consisting of hydrochloric acid and sulphuric acid while maintaining the resulting acidified mixture at a temperature of at least about 100° C. to produce an acid-soluble flavanone glycoside product, heating said acidified mixture for sufficient time to effect substantial hydrolysis of said flavanone glycoside, and recovering the flavanone formed.

2. A process for hydrolyzing an acid-insoluble flavanone glycoside in a substantially exclusively aqueous system to obtain a flavanone said flavanone glycoside being capable of forming a soluble complex with alkali which comprises first dissolving the flavanone glycoside in an aqueous solution of an alkali selected from the class consisting of the alkali metal hydroxides and ammonium hydroxide, gradually adding said alkaline glycoside solution to a substantially larger volume of a hot aqueous acid selected from the class consisting of hydrochloric acid and sulphuric acid containing sufficient acid to provide a pH below about 0.5 in the resulting mixture, maintaining said mixture at a temperature above about 100° C. for a sufficient length of time to effect substantial hydrolysis of said flavanone glycoside, and recovering the aglycone formed.

3. A process for preparing hesperetin from hesperidin which comprises forming an aqueous solution of hesperidin chalcone and an alkali selected from the class consisting of the alkali metal hydroxides and ammonium hydroxide, rapidly acidifying said chalcone solution to a pH below about 1.0 with an aqueous acid selected from the class consisting of hydrochloric acid and sulphuric acid while maintaining the resulting acidified mixture at a temperature of at least about 100° C. to produce acid-solubilized hesperidin, hydrolyzing the acidified mixture, and recovering the hesperetin formed.

4. A process for preparing hesperetin from hesperidin which comprises forming a water-soluble chalcone of hesperidin in an aqueous solution of an alkali selected from the class consisting of the alkali metal hydroxides and ammonium hydroxide, gradually adding said alkaline chalcone solution to a sufficient amount of a hot aqueous acid selected from the class consisting of hydrochloric acid and sulphuric acid to neutralize said alkaline solution and to provide a resulting acidic mixture having a pH below about 1.0, maintaining said acidic mixture at a temperature of at least about 100° C. for a sufficient length of time to effect substantial hydrolysis of the sugar component from the aglycone residue of hesperidin, and recovering the precipitated hesperetin.

5. A process for preparing hesperetin from hesperidin which comprises first dissolving the hesperidin in an aqueous solution of an alkali selected from the class consisting of the alkali metal hydroxides and ammonium hydroxide, gradually adding said alkaline hesperidin solution to a substantially larger volume of a hot aqueous acid selected from the class consisting of hydrochloric acid and sulphuric acid containing sufficient acid to provide a pH below about 0.5 in the resulting mixture, boiling said mixture at substantially at least atmospheric pressures for a sufficient length of time to effect substantial hydrolysis of said hesperidin, and recovering the hesperetin formed.

6. A process for hydrolyzing hesperidin in a substantially exclusively aqueous system which comprises first forming a water-soluble chalcone of hesperidin in an aqueous solution of an alkali selected from the class consisting of the alkali metal hydroxides and ammonium hydroxide, gradually adding said chalcone solution to a substantially larger volume of a hot aqueous acid selected from the class consisting of hydrochloric acid and sulphuric acid containing sufficient acid to neutralize said alkaline solution and provide a pH below about 0.5 in the resulting mixture, boiling and agitating said mixture at at least atmospheric pressure for a sufficient length of time to effect substantial hydrolysis of said hesperidin, and recovering the hesperetin formed.

7. A process for preparing hesperetin from hesperidin which comprises dissolving the hesperidin in a sodium hydroxide solution, gradually adding the resulting hesperidin sodium hydroxide solution to sufficient hot aqueous hydrochloric acid solution to neutralize the hesperidin-sodium hydroxide solution and to provide a resulting acidic mixture having a pH below 1, maintaining said acidic mixture at a temperature of at least about 100° C. for a sufficient length of time to effect substantial hydrolysis of the sugar component from the aglycone residue of hesperidin, and recovering the precipitated hesperetin.

References Cited in the file of this patent

UNITED STATES PATENTS

| | | |
|---|---|---|
| 2,152,827 | Szent-Gyorgyi | Apr. 4, 1939 |
| 2,348,215 | Higby | May 9, 1944 |
| 2,421,061 | Higby | May 27, 1947 |
| 2,425,291 | Wilson | Aug. 5, 1947 |
| 2,442,110 | Baier | May 25, 1948 |

OTHER REFERENCES

Wilson, J. Am. Chem. Soc. 61 (1939), 2303–5.